April 16, 1940.　　　　A. ASHTON　　　　2,197,063
HYDRAULIC CLUTCH
Filed Feb. 25, 1938　　　2 Sheets-Sheet 1
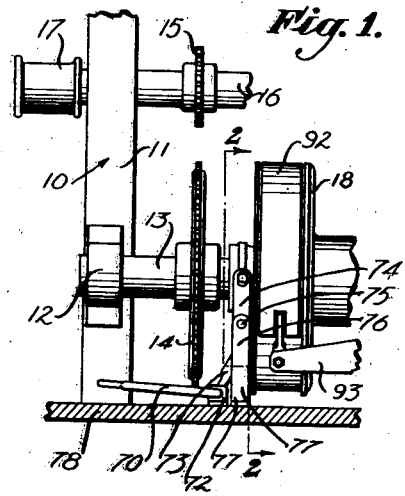
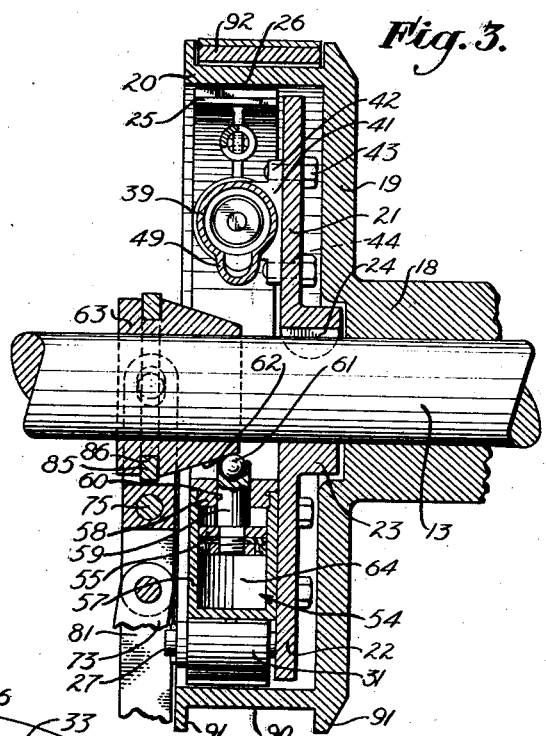
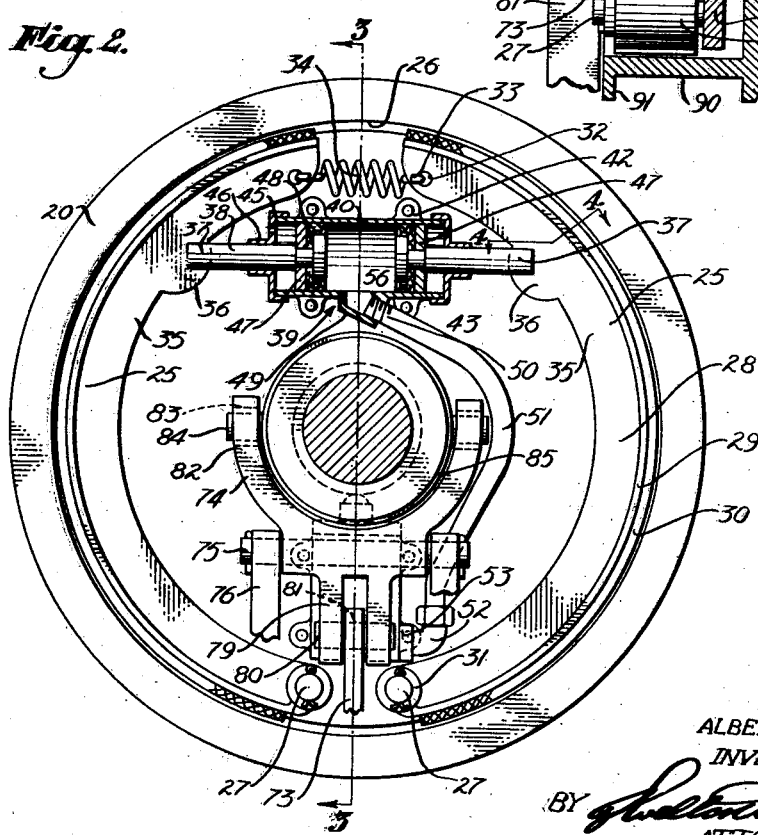
ALBERT ASHTON,
INVENTOR,
BY
ATTORNEY April 16, 1940.    A. ASHTON    2,197,063
HYDRAULIC CLUTCH
Filed Feb. 25, 1938    2 Sheets-Sheet 2

ALBERT ASHTON,
INVENTOR,
BY
ATTORNEY

Patented Apr. 16, 1940

2,197,063

UNITED STATES PATENT OFFICE 2,197,063

HYDRAULIC CLUTCH

Albert Ashton, Los Angeles, Calif., assignor to Emsco Derrick & Equipment Company, Los Angeles, Calif., a corporation of California Application February 25, 1938, Serial No. 192,521

2 Claims. (Cl. 192—85)

This invention relates to draw works such as used in the drilling of oil wells, and relates in particular to clutch means for connecting a drum or spool of such draw works to the driven shaft on which the same is rotatably mounted.

It is an object of the invention to provide a draw works having a simple and effective form of clutch which may be brought smoothly and positively into driving engagement. A feature of my present invention is that by its use the driving force may be gradually and smoothly applied so that the application of a sudden force to the part to be driven is avoided, thereby avoiding the excessive strains which are produced in the use of clutches which tend to grab and also clutches which initiate the application of a driving force in a jerky manner or which accelerated the driven part in a series of impulses or jerks.

It is an object of the present invention to provide in a draw works a rotatably supported shaft having a member, such as a drum or spool turnably mounted thereon, and a friction clutch member operative between the shaft and the member, which is turnably mounted thereon, such clutch member having hydraulic means for applying the friction member, and having means contained within the clutch structure for producing a fluid pressure to actuate the hydraulic means; accordingly, my present invention operates without use of fluid ducts which extend to the exterior to a source of pressure fluid supply and therefore requires no packed fluid connections between an external stationary pressure fluid pipe and a rotating pressure fluid duct carried by a rotating part of the draw works.

It is a further object of my invention to provide a hydraulic clutch in which the operating parts are placed within the clutch shoes and may be arranged so as to be substantially statically and dynamically balanced.

It is a further object of the invention to provide, on the rotatable member which is turnable upon the shaft, a drum having a clutch face concentric to the axis of rotation of the shaft, friction shoes positioned so as to be moved into engagement with the clutch face and drum together with mechanically operated force exerting means with associated fluid pressure producing means and fluid pressure utilizing means mounted on the shaft as a part of the clutch structure and being operative to apply the friction shoes to the clutch face in such manner that the pressure of the friction shoes against the clutch face will be evenly distributed and smoothly applied.

It is a further object of the invention to provide a rotatable shaft having a member turnable thereon, which member is provided with a drum having a brake disposed for application to the exterior of the drum and a self-contained hydraulically actuated friction clutch fixed on the shaft so as to lie within the drum, there being means for mechanically applying force from the exterior to actuate the self-contained hydraulic clutch mechanism.

Further objects and advantages of the invention will be brought out in the following part of the specification.

Referring to the drawings which are for illustrative purposes only:

Fig. 1 is a fragmentary elevational section showing a part of a draw works embodying my invention.

Fig. 2 is an enlarged fragmentary section taken substantially as indicated by the line 2—2 of Fig. 1.

Fig. 3 is a sectional view taken as indicated by the line 3—3 of Fig. 2.

Figure 4:
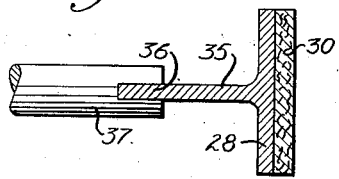
Fig. 4 is an enlarged fragmentary section taken as indicated by the line 4—4 of Fig. 2.

In Fig. 1, I show the end portion of a draw works 10 having a post 11 carrying a bearing 12 which rotatably supports a shaft 13. Such shaft 13 has a sprocket 14 fixed thereon which may be connected by means of a chain (not shown) with a sprocket 15 mounted on an upper shaft 16 which carries a cap head 17. To the right of the sprocket 14, a drum 18 is rotatably mounted on the shaft 13. The drum 18 has a flange 19 which carries a brake and clutch drum 20 disposed in concentric relation to the shaft 13. A radially extending support 21 is fixed on the shaft 13 in a position within the drum 20, such support 21 comprising preferably a circular plate 22 having a hub 23 to fit the shaft 13, there being a key 24 to drivably connect the support 21 to the shaft 13.

Friction shoes 25 are supported by the member 21 inside the drum 20 in such positions that these friction shoes 25 may be forced outwardly into engagement with the inner cylindrical clutch face 26 of the drum 20. The shoes 25 are of substantially identical form and are disposed on opposite sides of a medial plane, such as defined by the line 3—3 of Fig. 2, by means of pins 27 which project outwardly from the plate 22 near the periphery thereof. Each shoe 25 comprises a metal base 28 of T-shaped cross-section, carrying on the outer wall 29 thereof a layer of fabric or moulded friction material 30. Each friction shoe frame 28 has a tube 31 at one end thereof to receive a supporting pin 27, and the other end of the friction shoe base 28 has an opening 32 so that the hooked ends 33 of a retracting spring 34 may be connected to the free ends of the friction shoes 25 to swing the same away from the clutch surface 26 of the drum 20. Near the free ends of the friction shoe bases 28, the webs 35 thereof are provided wtih arcuate projections 36 adapted to be engaged by the outer ends 37 of the bars 38 which project in opposite directions from a hydraulic expanding means 39 which is secured to the wall of plate 22 of the support 21.

The hydraulic expanding means 39 comprises an open end cylindrical wall 40 provided with a base 41 having lugs 42 into which securing screws 43 may be screwed, said screws passing through openings 44 in the plate 22. Caps 45, connected to the ends of the cylinder 39, have guide openings 46 therein through which the rods 38 project into the ends of the cylinder 39 to be therein connected to pistons 47 provided with cup washers 48 which face inwardly. The lower wall of the cylinder 39 is provided with a centrally disposed fluid port 49 into which the end 50 of a tube 51 is screwed. The remaining end of the tube 51 is connected to an elbow 52 having threaded connection with the port 53 of a collapsible chamber member 54, having at least one part, such as a piston 55, which may be moved so as to reduce the volume of the collapsible chamber member, thereby applying pressure to a hydraulic fluid which is transmitted through a pipe 51 to the central space 56 of the hydraulic expanding means 39.

The collapsible chamber member 54 comprises a cylinder 57 which is supported on the plate 22 in diametrally opposed relation to the fluid expanding means 39, this cylinder 57 being disposed with its axis extending radially with respect to the shaft 13, and having a plug 58 in the inner open end thereof. For moving the piston 55 downwardly or outwardly within the cylinder 57, a stem 59 is provided which projects inwardly through an opening 60 in the plug 58, the inner end of this stem 59 having a steel ball 61 secured therein in position to be engaged by the sloping wall 62 of an actuating member 63 which is in the form of a collar slidably disposed on the shaft 13, the sloping face 62 of such collar 63 being conical and converging inwardly, or toward the drum 18, so that when such collar 63 is moved in positive direction, which is inward, the ball 61 will ride up the sloping face 62 and the stem and its supported piston 55 will be forced downwardly, thereby applying pressure to the hydraulic fluid contained in the chamber 64 of the cylinder 57 below the piston 55.

The entire hydraulic mechanism of my clutch is contained in the clutch structure. The force required for placing the hydraulic fluid in the chamber 64 under pressure is received from the exterior of the clutch structure through the medium of the actuating member 63. As a force imparting means for giving operative movement to the actuating member 63 I have shown a lever 70, Fig. 1, supported by a bearing lock 72 and being connected to a lever 73 which projects diagonally upwardly toward the clutch mechanism. A yoke 74 is carried on a shaft 75 supported by the arms 76 of a support 77 secured to the floor 78. The yoke 74 has parallel levers 79 projecting downwardly therefrom, such levers 79 carrying a pin 80 which passes through an opening 81 in the upper end of the lever 73. The upper ends of the arms 82 of the yoke 74 are provided with slots 83 to receive trunnions 84 which project diametrally from a thrust spring 85 received in a groove 86 formed in the collar 63. When the left end of the lever or pedal 70 is forced downwardly, so as to rotate the lever 73 in anti-clockwise direction, the yoke 74 will be rotated in clockwise direction and the collar 63 will be moved to the right or in positive direction to cause the sloping face 24 thereof to force the stem 59 and its associated pressure piston 55 downwardly. The pressure applied to the hydraulic fluid in the chamber 64 will be transmitted to the inner faces of the piston 47 of the hydraulic expanding means 39, forcing the same outwardly with equal pressure, with the result that the friction shoes 25 will be applied with equal pressure to the clutch face 26 of the drum 20.

The drum 20 has a braking face 90 which is cylindrical and is preferably formed between a pair of radially projecting flanges 91. A brake band 92 is shown in cooperative relation to the braking face 90 of the drum 20, such brake band 92 being adapted to be contracted against the face 90 by any of the customary types of brake actuating means, such as indicated at the lever 93 of Fig. 1. The shaft 13, being power driven, may be connected to the drum 18 so as to drive the same by actuation of the clutch mechanism as previously described. Ordinarily, during spooling in, that is to say letting out the cable so as to lower a member into the well, the clutch is disengaged, the speed of rotation of the drum 18 being controlled by use of the brake band 92. However, where a fluid type of revolution control, such as a hydromatic brake, is employed the clutch may be engaged during spooling in.

Figure 5:
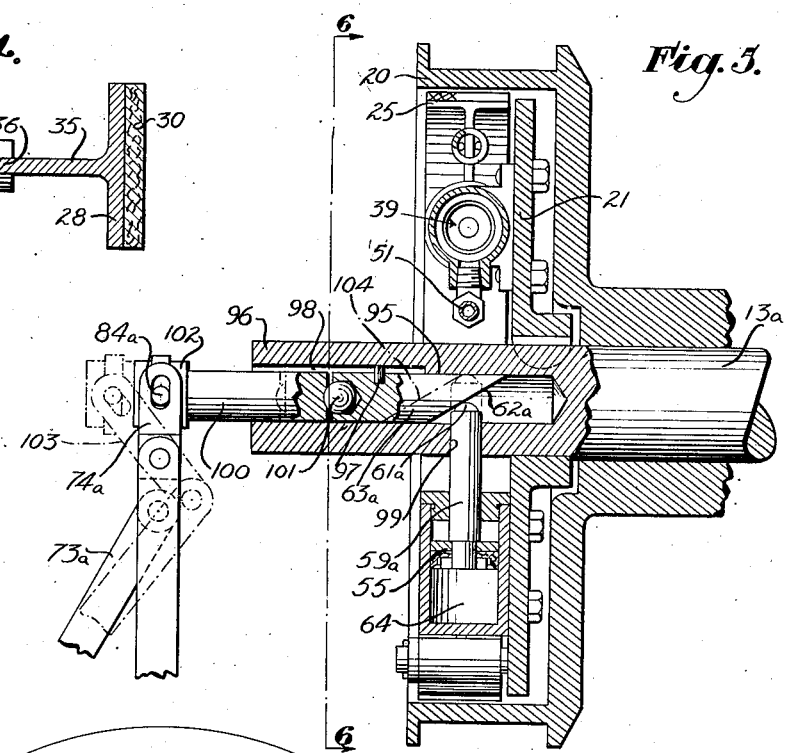
Fig. 5 is a fragmentary sectional view showing an alternative form of my invention.
Figure 6:
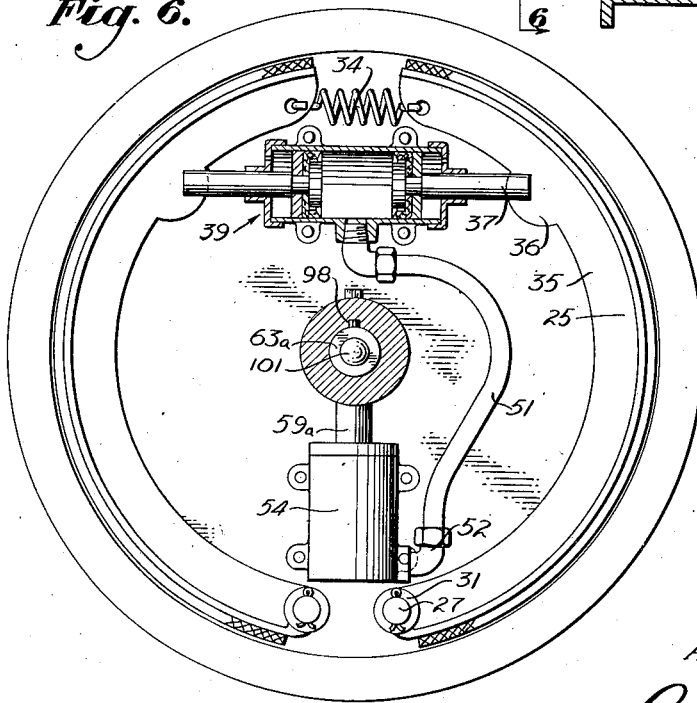
Fig. 6 is a sectional view taken on the plane indicated by the line 6—6 of Fig. 5.

In the alternative form of the invention shown in Figs. 5 and 6 the same drum 20, support 21, shoes 25, hydraulic expanding means 39, and fluid pressure producing means 54, as shown and described in Figs. 2 and 3, are employed, and such duplicate parts are given the same numerals as previously employed. This alternative form of the invention avoids the use of the collar 63, and has in place of the shaft 13 a shaft 13a with an axial opening 95 extending inwardly from the outer end 96 thereof. Sliding in this opening 95 there is an actuating member 63a in the form of a cylindrical body having a sloping face 62a at the inner end thereof. Rotation of the member 63a relative to the shaft 13a is prevented by a pin 97 which projects outwardly from the member 63a into a longitudinal groove 98 formed in the wall which surrounds the axial opening 95. The stem 59 of Fig. 3 is replaced by a longer stem 59a which projects radially inwardly through a radial opening 99 formed in the shaft 13a so as to communicate with the axial opening 95. The inner end of the stem 59a carries a steel ball 61a in position to be engaged by the sloping face 62a. The force exerting means of this form of the invention comprises a bar 100 which projects into the end of the axial opening 95 so as to engage a ball 101 held in the outer end of the member 63a. The outer end of the member 100 is provided with a head 102 carrying diametrically projecting trunnions 84a which are engaged by a yoke 74a which may be swung from a position such as indicated by dotted lines 103 to full line position by means of a lever 73a. This movement of the yoke 74a from dotted line position 103 to the full line position thereof will move the bar 100 so as to force the actuating member 83a from its retracted position shown in dotted lines 104 to or through a position such as that in which it is shown in full lines in Fig. 5, thereby causing the sloping face 62a to force the stem 59a downwardly to move the piston 55 in a manner to place the hydraulic fluid in the chamber 64 under pressure which pressure is instantaneously transmitted to the hydraulic expanding means 39 to actuate the clutch-mechanism in the manner described relative to Figs. 2 and 3.

Although I have shown simple and practical forms of my invention, it is recognized that various parts of elements thereof may be replaced by other parts or elements of mechanically equivalent character; therefore, the invention is not to be limited to the details disclosed herein but should be accorded the full scope of the hereto appended claims.

I claim as my invention:

1. In a clutch mechanism for draw works, the combination of: a rotatably supported shaft, said shaft having an opening therein; a member turnably mounted on said shaft, said member having a drum thereon concentric to said shaft; a radially extending support fixed on said shaft in co-dially extending support fixed on said shaft in cooperative relation to said drum; friction shoe means carried by said support in position to be forced against said drum; hydraulic expanding means operative to force said shoe means against said drum; a collapsible chamber member carried by said support, said chamber member having a part which moves to reduce the volume thereof, there being a duct connecting said chamber member to said expanding means; an actuating member movable in said opening of said shaft; means operative in response to movement of said actuating member to move said part so as to reduce the volume of said chamber member; and a pressure exerting member extending in said opening of said shaft and being operative to forcibly move said actuating member.

2. In a clutch mechanism for draw works, the combination of: a rotatably supported shaft, said shaft having an axial opening and a radial opening communicating with said axial opening; a member turnably mounted on said shaft, said member having a drum thereon concentric to said shaft; a radially extending support fixed on said shaft; friction shoe means carried by said support in position to be expanded against said drum; hydraulic expanding means operative to expand said friction shoe means; a pressure cylinder mounted on said support so as to face inwardly toward said shaft, there being a duct connecting said pressure cylinder with said hydraulic expanding means; a piston in said cylinder; a member axially movable in said axial opening of said shaft and having a sloping face; a pin extending through said radial opening of said shaft in position to be engaged by said sloping face and moved outwardly when said axially movable member is so moved, the outer end of said pin having connection with said piston whereby to move the same in said cylinder; and force exerting means extending in said axial opening of said shaft and being operative to move said axially movable member therein.

ALBERT ASHTON.